(12) United States Patent
Matsuura et al.

(10) Patent No.: US 7,575,287 B2
(45) Date of Patent: Aug. 18, 2009

(54) VEHICLE BRAKE SYSTEM

(75) Inventors: Masahiro Matsuura, Chiryu (JP); Koichi Kokubo, Nagoya (JP); Shigeru Saito, Kariya (JP); Yuji Sengoku, Togo (JP)

(73) Assignee: Advics Co., Ltd., Kariya, Aichi (JP)

( * ) Notice: Subject to any disclaimer, the term of this patent is extended or adjusted under 35 U.S.C. 154(b) by 358 days.

(21) Appl. No.: 11/507,465

(22) Filed: Aug. 22, 2006

(65) Prior Publication Data

US 2007/0046099 A1 Mar. 1, 2007

(30) Foreign Application Priority Data

Aug. 29, 2005 (JP) ............................. 2005-248117

(51) Int. Cl.
*B60T 8/60* (2006.01)
(52) U.S. Cl. ........................................ 303/152; 701/70
(58) Field of Classification Search .................... 701/70, 701/71; 303/152, 155, 11, 163, 167, 156, 303/115.2
See application file for complete search history.

(56) References Cited

U.S. PATENT DOCUMENTS 6,957,874 B2  10/2005  Hara et al.
7,136,737 B2 * 11/2006  Ashizawa et al. ............. 701/70

FOREIGN PATENT DOCUMENTS

JP        2002-356151 A      12/2002

* cited by examiner

*Primary Examiner*—Melanie Torres
(74) *Attorney, Agent, or Firm*—Buchanan Ingersoll & Rooney PC

(57) ABSTRACT

An improved vehicle brake system for controlling the frictional braking force and the regenerative braking force to be applied to a wheel of a vehicle. The brake system reduces the regenerative braking force to a predetermined force and keeps the regenerative braking force at the predetermined force before the start of anti-lock control. When the anti-lock control starts, the brake system decreases the regenerative braking force from the predetermined force. With this arrangement, it is possible to quickly eliminate a locking tendency of any wheel of the vehicle, thereby stabilizing the vehicle.

7 Claims, 12 Drawing Sheets

VEHICLE BRAKE SYSTEM

CROSS REFERENCE TO RELATED APPLICATIONS

This application is based on and claims priority under 35 U.S.C. sctn. 119 with respect to Japanese Patent Application No. 2005-248117 filed on Aug. 29, 2005, the entire content of which is incorporated herein by reference.

BACKGROUND OF THE INVENTION

The present invention relates to a vehicle brake system having an anti-lock control function for preventing lockup of the vehicle wheels while the brakes are being applied to the wheels.

Among such known vehicle brake systems, there are ones comprising a friction mechanism for applying frictional braking force to vehicle wheels and a motor for applying regenerative braking force to vehicle wheels. The motor applies regenerative braking force to a plurality of wheels, typically to drive wheels, all at once. Thus, as soon as the anti-lock control, which is performed on individual wheels, starts, the regenerative braking function is disabled, and the anti-lock control is performed based solely on the frictional braking force.

In order to prevent a sudden and sharp fall of the vehicle deceleration due to the regenerative braking being disabled at the start of anti-lock control, JP patent publication 2002-356151A proposes to reduce the regenerative braking force before the start of the anti-lock control and simultaneously increase the frictional braking force corresponding to the reduction of the regenerative braking force.

In this arrangement, there is the possibility that the regenerative braking force may decrease to zero before the start of the anti-lock control and as a result, only the frictional braking force is applied to the wheels. If the anti-lock control starts in this state, the frictional braking force is reduced to eliminate the locking tendency of a wheel. Compared to electrically generated regenerative braking force, mechanically generated frictional braking force cannot be sufficient quickly increased or reduced in response to a control signal. Thus, it takes a rather long time to reduce frictional braking force until the locking tendency of the wheel is eliminated. This could destabilize the behavior of the vehicle. Also, if the regenerative braking force drops to zero before the start of the anti-lock control, it becomes impossible to recover energy by regenerative braking, thus lowering energy efficiency of the vehicle.

SUMMARY OF THE INVENTION

An object of the present invention is to quickly eliminate a locking tendency of any vehicle wheel, thus stabilizing the vehicle.

According to the present invention, there is provided a vehicle brake system for controlling a frictional braking force applied to a wheel of a vehicle by means of a friction brake and a regenerative braking force applied to the wheel of the vehicle by a motor, the vehicle brake system comprising an anti-lock controller for performing anti-lock control in which the friction brake is controlled to prevent the wheel from locking when the wheel shows a tendency to lock, a braking force ratio adjuster for performing braking force ratio adjustment in which the regenerative braking force is reduced from a force determined by a braking operation of a driver of the vehicle to a predetermined force and kept at the predetermined force, and simultaneously, the frictional braking force is increased corresponding to the reduction of the regenerative braking force, before the anti-lock control starts, and a regenerative braking force reducer for reducing the regenerative braking force from the predetermined force when the anti-lock control starts.

In this arrangement, the braking force ratio adjuster keeps the regenerative braking force to the predetermined force before the start of the anti-lock control, and the regenerative braking force reducer reduces the regenerative braking force from the predetermined force when the anti-lock control starts. Thus, upon the start of the anti-lock control, it is possible to quickly reduce the braking force and thus to quickly eliminate a locking tendency of any wheel. Also, it is possible to reliably recover energy by regenerative braking.

Preferably, the brake system further comprises a friction coefficient detector for detecting the friction coefficient of the road surface on which the vehicle is traveling, and the predetermined force is determined by the braking force ratio adjuster based on the friction coefficient detected by the friction coefficient detector. With this arrangement, because the value at which the regenerative braking force is kept before the start of the anti-lock control is determined based on the friction coefficient of the road surface, it is possible, at the start of the anti-lock control, to quickly eliminate a locking tendency of any wheel by reducing the regenerative braking force while suppressing the reduction of the regenerative braking force.

Preferably, the predetermined force is determined by the braking force ratio adjuster to half the maximum frictional force generated on the road surface of which the friction coefficient is detected by the friction coefficient detector. With this arrangement, it is possible, at the start of the anti-lock control, to quickly eliminate a locking tendency of any wheel by reducing the regenerative braking force while further suppressing the reduction of the regenerative braking force.

The braking force ratio adjuster preferably comprises a slip rate detector for detecting the slip rate of the wheel, a regenerative braking force adjuster for reducing the regenerative braking force corresponding to an increase in the slip rate to the predetermined force and keeping the regenerative braking force at the predetermined force, before the anti-lock control starts, and a frictional braking force adjuster for increasing the frictional braking force corresponding to a reduction in the regenerative braking force while the regenerative braking force is being reduced by the regenerative braking force adjuster. With this arrangement, even if the slip rate sharply increases before the anti-lock control, the regenerative braking force can be reduced quickly corresponding to the increase in the slip rate. This reliably prevents a sharp drop of the vehicle deceleration due to a reduction in the regenerative braking force at the start of the anti-lock control.

Preferably, the regenerative braking force adjuster of such a braking force ratio adjuster has an additional function of increasing the regenerative braking force corresponding to a reduction in the slip rate, and the frictional braking force adjuster of the braking force ratio adjuster has an additional function of reducing the frictional braking force corresponding to an increase in the regenerative braking force while the regenerative braking force is being increased by the regenerative braking adjuster. With this arrangement, when the slip rate decreases, the regenerative braking force increases corresponding to the reduction in the slip rate, so that energy can be recovered more efficiently by regenerative braking before the start of the anti-lock control.

According to the present invention, the regenerative braking force is maintained at a predetermined force before the start of the anti-lock control, and is reduced from the predetermined force at the start of the anti-lock control. The braking force thus decreases quickly at the start of the anti-lock quickly, so that it is possible to quickly eliminate a locking tendency of any wheel, thus stabilizing the vehicle.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
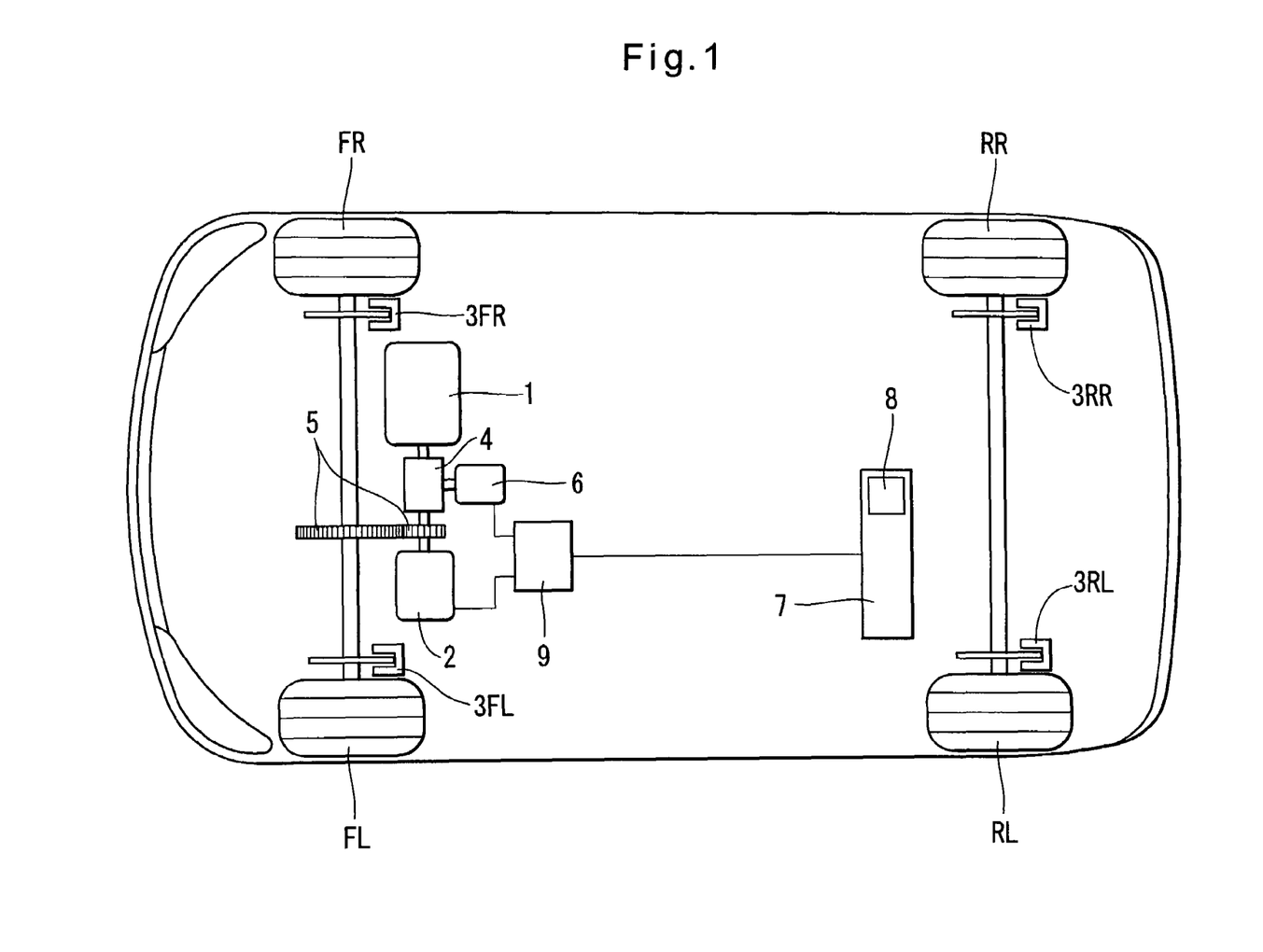
FIG. 1 is a schematic view of a vehicle carrying a vehicle brake system embodying the present invention.

FIG. 1 schematically shows a vehicle including the brake system according to the present invention. The vehicle shown carries what is known as a hybrid drive system comprising an engine 1 and an electric motor 2. The brake system shown includes friction brake units 3FL, 3FR, 3RL and 3RR which are mounted to the front wheels FL and FR and the rear wheels RL and RR, respectively, to produce frictional braking force.

Figure 2:
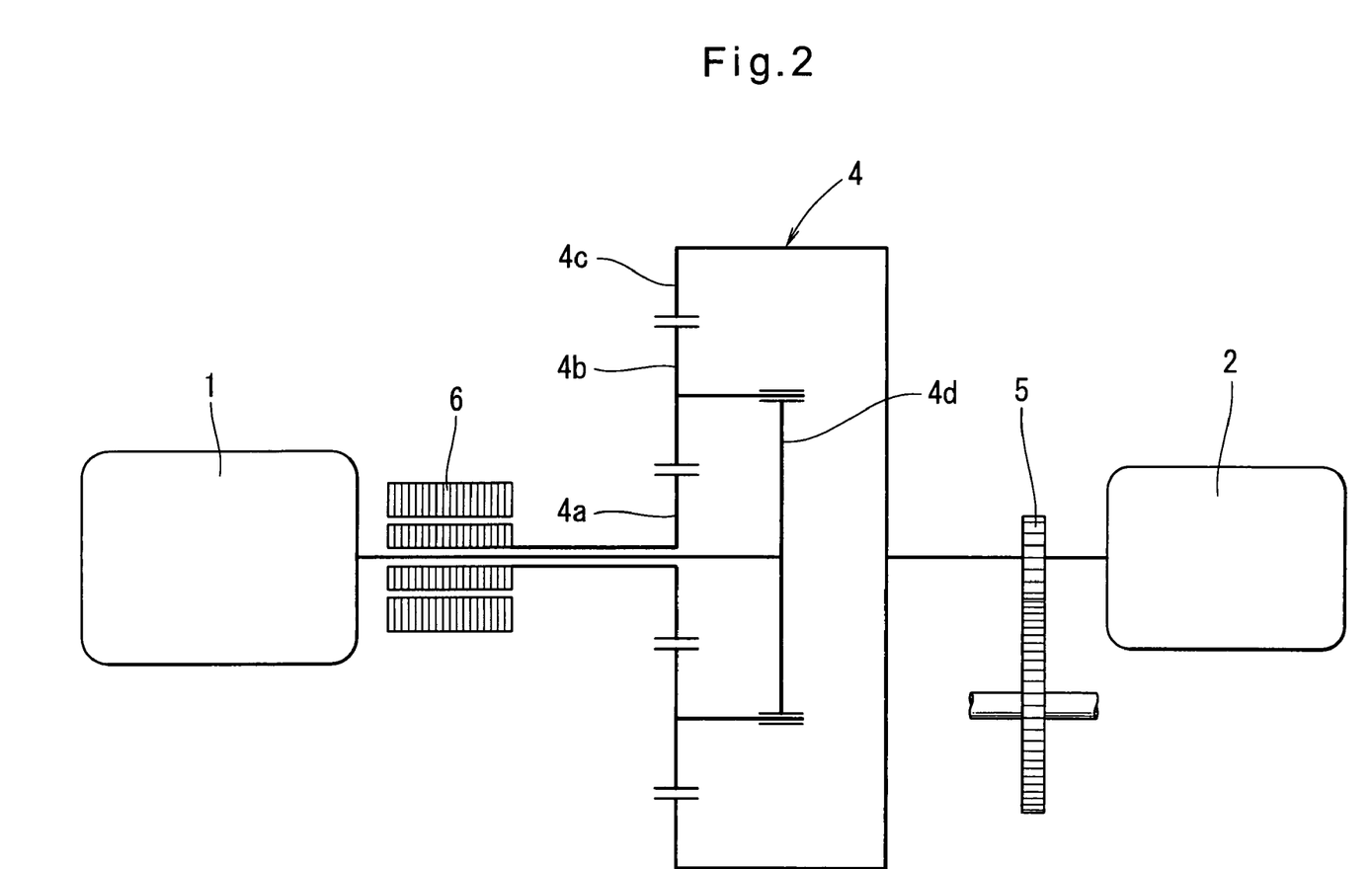
FIG. 2 schematically shows a power split device used in the vehicle of FIG. 1.

The engine 1 is connected to the front wheels FR and FL through a power split device 4 and reduction gears 5. As shown in FIG. 2, the power split device 4 comprises a sun gear 4a, planetary gears 4b that rotate about the sun gear 4a while meshing with the sun gear 4a, a ring gear 4c having internal gear teeth meshing with the planetary gears 4b, and a planet carrier 4d supporting the planetary gears 4b. The planetary carrier 4d is coupled to the engine 1, the ring gear 4c is coupled to the reduction gears 5, and the sun gear 4a is coupled to a generator 6. Thus, the power of the engine 1 is partially transferred to the front wheels FR and FL through the reduction gears 5 and partially to the generator 6. The generator 6 converts the power transferred from the engine 1 through the power split device 4 to electricity.

As shown in FIG. 1, the motor 2 is connected to the front wheels FR and FL through the reduction gears 5 to drive the front wheels FR and FL. During braking, the motor 2 is rotated by the front wheels and functions as a generator to apply regenerative braking force to the front wheels FR and FL. The electric power generated during such regenerative braking is stored in a battery 7. The battery 7 includes an electronic control unit 8 for battery (hereinafter referred to as "battery ECU"). The battery ECU 8 detects the charge level of the battery 7.

The motor 2, generator 6 and battery 7 are electrically connected together through an inverter 9, so that electric power can be transferred therebetween. The inverter 9 is controlled by a hybrid electronic control unit (hereinafter referred to as "hybrid ECU") 10 shown in FIG. 3.

Figure 4:
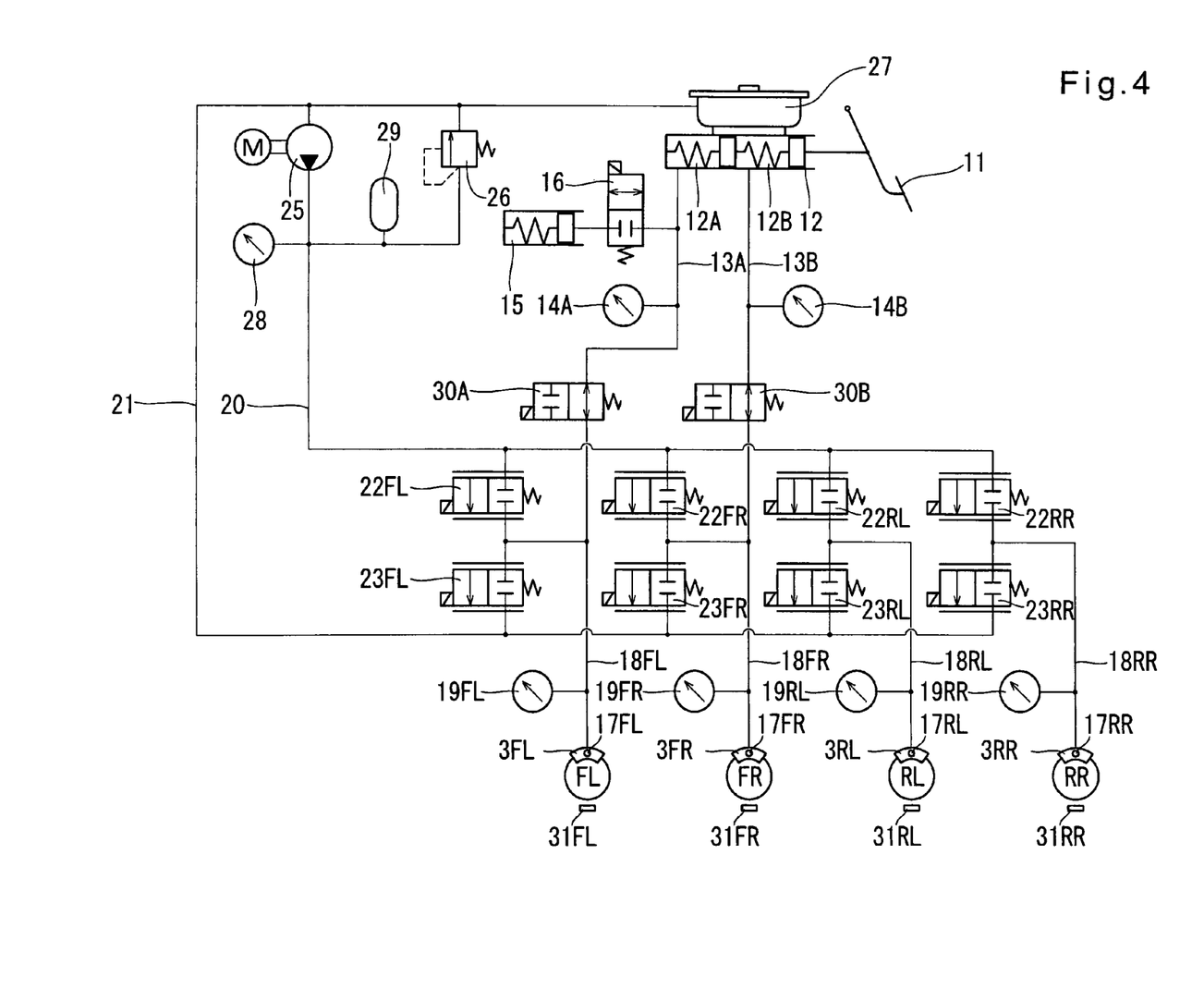
FIG. 4 is a diagram of the vehicle brake system of FIG. 1, showing how its hydraulic lines are connected to the friction brake units of the vehicle.

A brake system according to the present invention includes a hydraulic system shown in FIG. 4, which is connected to the friction brake units 3FL, 3FR, 3RL and 3RR. The hydraulic system shown is a brake-by-wire hydraulic system, which converts the input from the brake pedal 11 to an electric signal and applies, based on the electric signal, frictional braking force to the wheels.

The hydraulic system shown includes a master cylinder 12 for converting the force applied to the brake pedal 11 to hydraulic pressure. The hydraulic pressure produced in a pressure chamber 12A defined in the master cylinder 12 is detected by a hydraulic pressure sensor 14A provided in an input line 13A connected to the pressure chamber 12A. The hydraulic pressure produced in another pressure chamber 12B defined in the master cylinder 12 is detected by a hydraulic pressure sensor 14B provided in an input line 13B connected to the pressure chamber 12B.

A stroke simulator 15 is coupled to the input line 13A. The stroke simulator 15 serves to impart a stroke corresponding to the input from the brake pedal 11 to the brake pedal 11. Between the stroke simulator 15 and the input line 13A, a stroke simulator shut-off valve 16 is provided.

The friction brake unit 3FL includes a wheel cylinder 17FL for driving friction members (not shown). The wheel cylinder 17FL is actuated by hydraulic pressure supplied through an output line 18FL connected to the wheel cylinder 17FL. Hydraulic pressure in the wheel cylinder 17FL is detected by a hydraulic pressure sensor 19FL in the output line 18FL.

To the output line 18FL, a high-pressure line 20 is connected through a pressure increasing control valve 22FL, and a low-pressure line 21 is connected through a pressure reducing control valve 23FL. The pressure increasing control valve 22FL and the pressure reducing control valve 23FL are both proportional control valves of which the degrees of opening are adjusted by a control signal applied thereto from a brake electronic control unit (hereinafter referred to as "brake ECU") 24 shown in FIG. 3.

Similarly, the friction brake units 3FR, 3RL and 3RR include wheel cylinders 17FR, 17RL and 17RR, respectively. The hydraulic pressures in the wheel cylinders 17FR, 17RL and 17RR are detected by hydraulic pressure sensors 19FR, 19RL and 19 RR provided in output lines 18FR, 18RL and 18RR connected to the wheel cylinders 17FR, 17RL and 17RR, respectively. The output lines 18FR, 18RL and 18RR are connected to the high-pressure line 20 through pressure increasing control valves 22FR, 22RL and 22RR, respectively, and to the low-pressure line 21 through pressure reducing control valves 23FR, 23RL and 23RR, respectively.

The high-pressure line 20 and the low-pressure line 21 are connected together through a pump 25. The pump 25 feeds brake fluid in the low-pressure line 21 into the high-pressure line 20. The high-pressure line 20 is also connected to the low-pressure line 21 through a relief valve 26. If the hydraulic pressure in the high-pressure line 20 exceeds a predetermined level, brake fluid in the high-pressure line 20 is returned into the low-pressure line 21 through the relief valve 26. The low-pressure line 21 is connected to a reservoir tank 27 for storing brake fluid.

To the high-pressure line 20 are mounted a hydraulic pressure sensor 28 for detecting the pressure in the high-pressure line 20 and a pressure accumulator 29 for storing pressurized brake fluid, thereby keeping the pressure in the high-pressure line 20. A detection signal from the hydraulic pressure sensor 28 is sent to the brake ECU 24, which applies a control signal to the pump 25 to activate the pump 25 when the brake ECU 24 determines that the pressure in the high-pressure line 20 is lower than a predetermined level based on the detection signal from the sensor 28.

The input line 13A and the output line 18FL are connected together through a master cylinder pressure shut-off valve 30A. The input line 13B and the output line 18FR are connected together through a master cylinder pressure shut-off valve 30B.

The front wheels FL and FR and the rear wheels RL and RR carry wheel speed sensors 31FL, 31FR, 31RL and 31RR, respectively.

Figure 3:
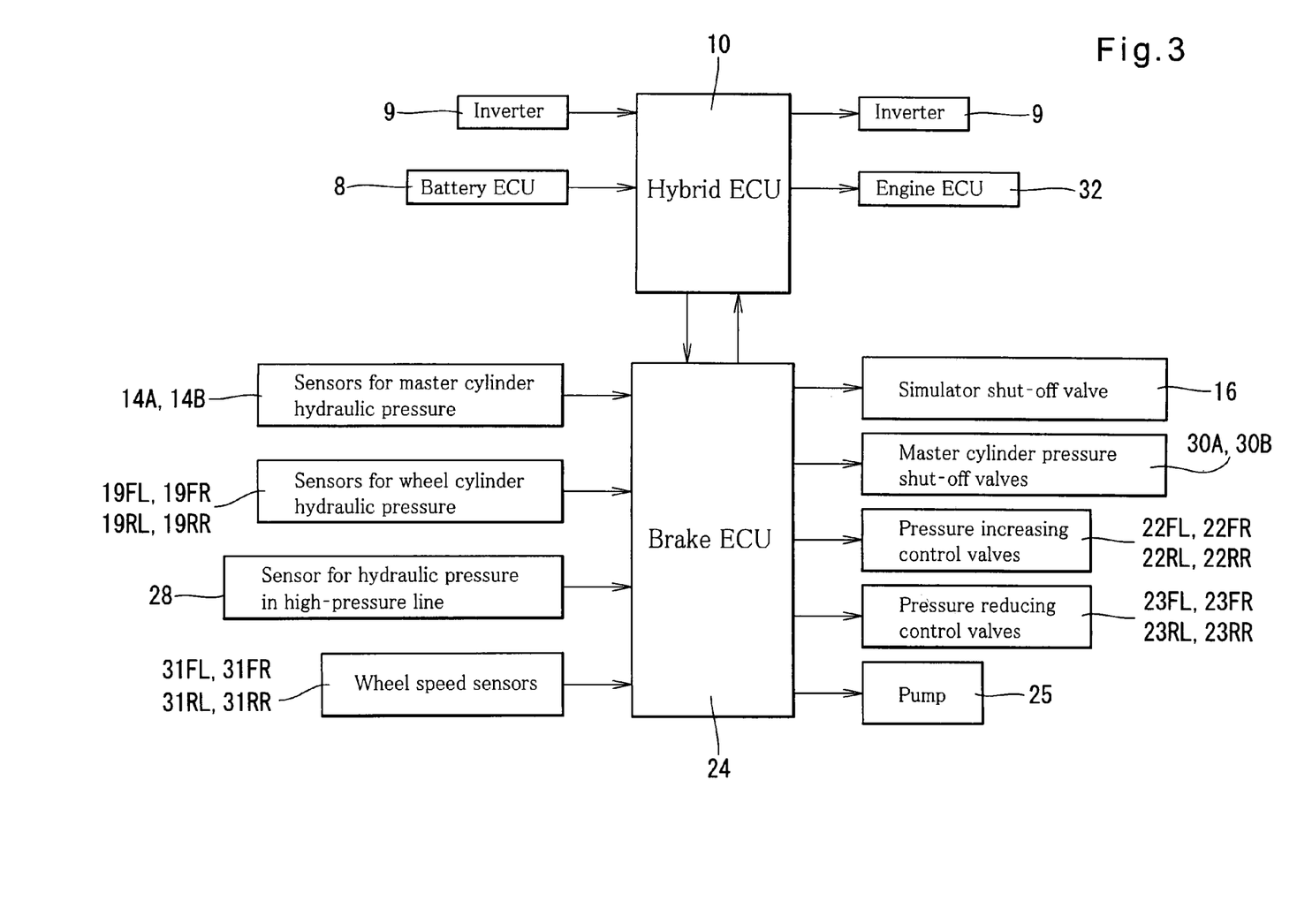
FIG. 3 is a block diagram of the vehicle brake system of FIG. 1.

As shown in FIG. 3, the brake ECU 24 receives signals indicating the hydraulic pressures in the pressure chambers 12A and 12B of the master cylinder 12 from the hydraulic pressure sensors 14A and 14B, signals indicating the hydraulic pressures in the wheel cylinders 17FL, 17FR, 17RL and 17RR from the respective hydraulic pressure sensors 19FL, 19FR, 19RL and 19RR, a signal indicating the hydraulic pressure in the high-pressure line 20 from the hydraulic sensor 28, and signals indicating the revolving speeds of the respective wheels from the respective wheel speed sensors 31FL, 31FR, 31RL and 31RR. Based on these signals, the brake ECU 24 applies control signals to the simulator shut-off valve 16, master cylinder pressure shut-off valves 30A and 30B, pressure-increasing control valves 22FL, 22FR, 22RL and 22RR, pressure-reducing control valves 23FL, 23FR, 23RL and 23RR and pump 25.

The hybrid ECU 10 receives signals indicating the revolving speeds of the motor 2 and the generator 6 from the inverter 9, and a signal indicating the charge level of the battery 7 from the battery ECU 8. Based on these signals, the battery ECU 8 applies control signals to the inverter 9, and an electronic control unit 32 for the engine (hereinafter referred to as "engine ECU"). Signals are also exchanged between the hybrid ECU 10 and the brake ECU 24.

Operations of the vehicle engine 1, motor 2, generator 6 and friction brake units 3FL, 3FR, 3RL and 3RR are now described.

While the vehicle is traveling at a low speed, only the motor 2 is powered by the battery 7 to drive the front wheels FL and FR, with the engine 1 shut off.

When the vehicle speed increases, the engine 1 is started. The power of the engine 1 is partially transferred to the front wheels FL and FR through the power split device 4 and partially transferred to the generator 6. Electric power thus generated by the generator 6 is used to power the motor 2. The front wheels FL and FR are thus driven by both the engine 1 and the motor 2. During hard acceleration of the vehicle, electric power is also supplied to the motor 2 from the battery 7 to increase the power of the motor 2.

During braking, the motor 2 functions as a generator, thus applying regenerative braking force to the front wheels FL and FR. The regenerative braking force is controlled by the inverter 9. Electric power generated by the motor 2 during regenerative braking is stored in the battery 7. If the regenerative braking force alone is insufficient, the friction brake units 3FL, 3FR, 3RL and 3RR are also actuated to apply frictional braking force to the front wheels FL and FR and the rear wheels RL and RR.

Figure 5:
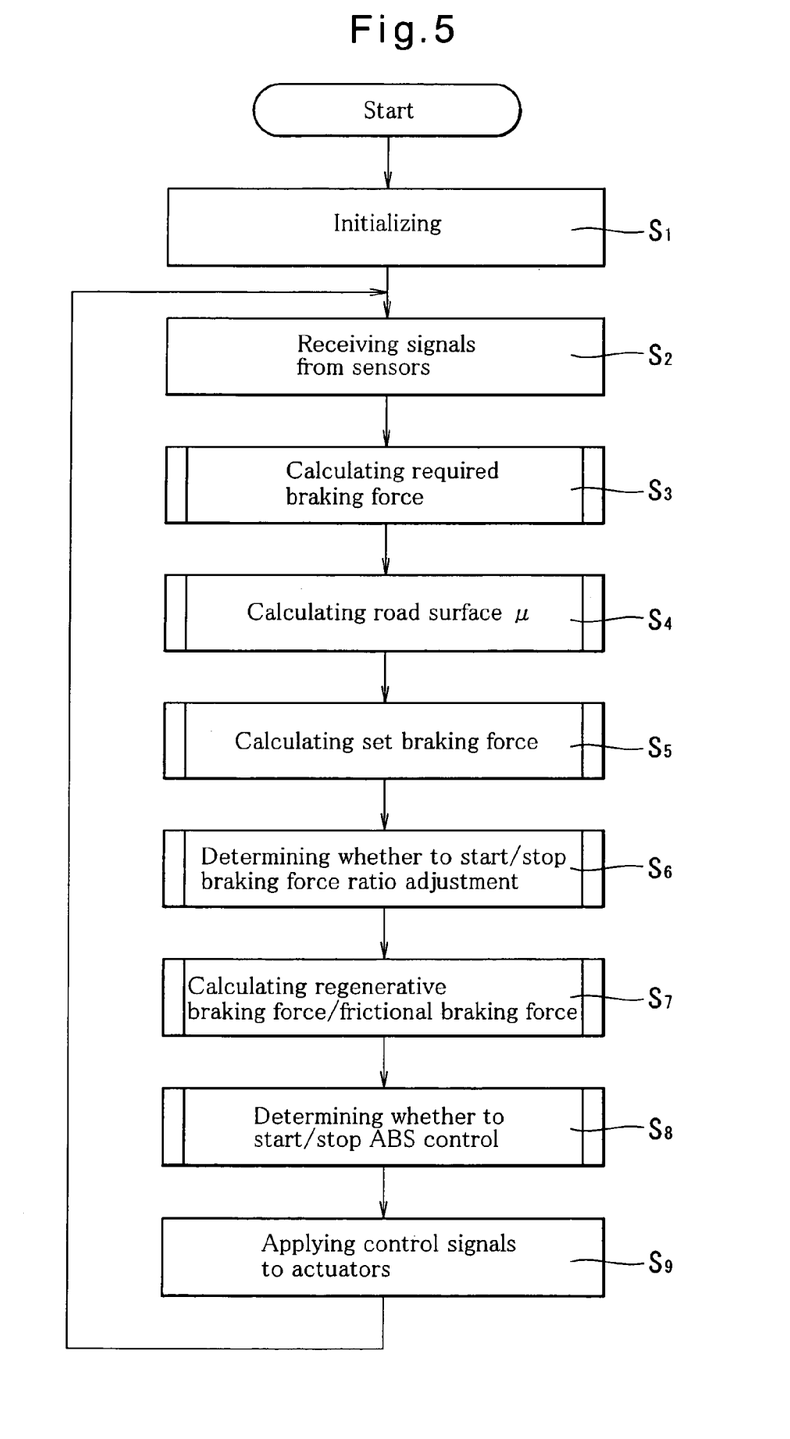
FIG. 5 is a flowchart of the control performed by the vehicle brake system of FIG. 1.
Figure 6:
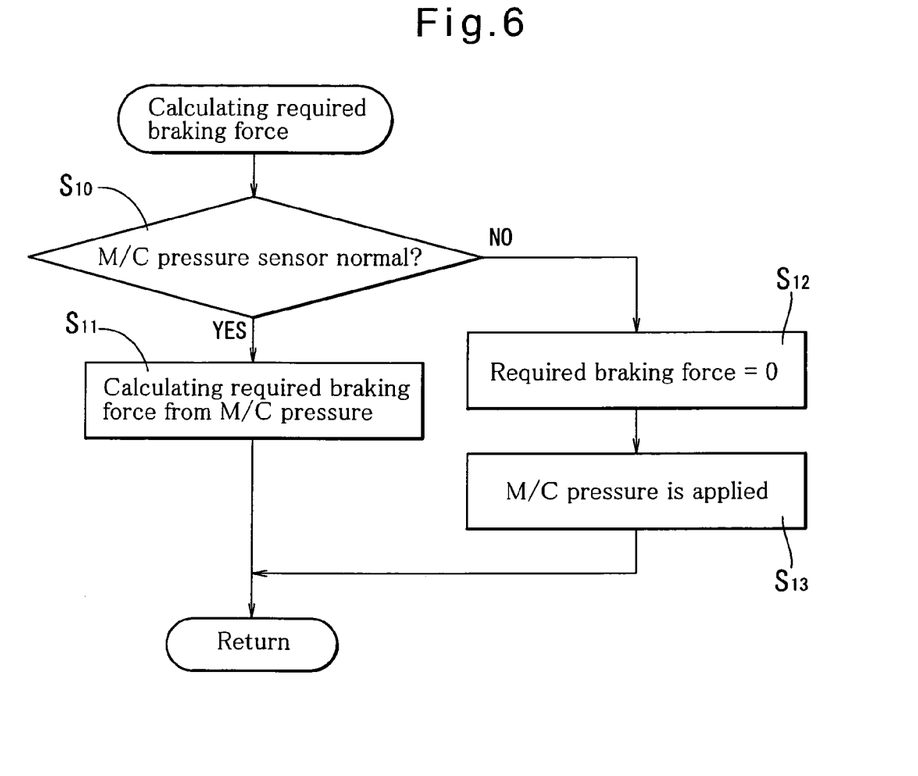
FIG. 6 is a flowchart of the subroutine in Step S3 of FIG. 5.

Description is now made on how the regenerative braking force and frictional braking force are controlled with reference to FIGS. 5 to 12. FIG. 5 shows the main routine of the control program. FIGS. 6, 8 and 10 to 12 show subroutines.

As shown in FIG. 5, the control program initializes variables in Step S1, and receives signals from the various sensors in Step S2.

Figure 7:
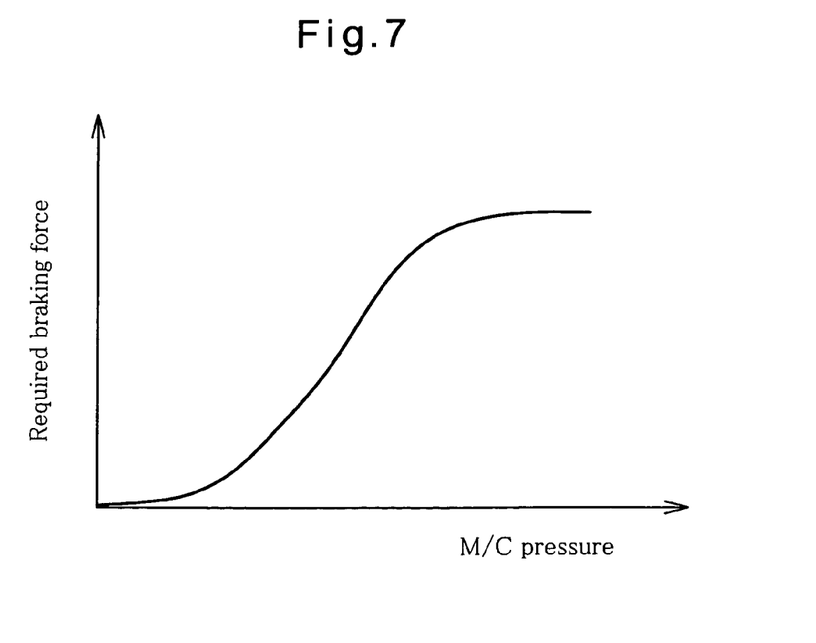
FIG. 7 is a graph showing the relationship between the hydraulic pressure in the master cylinder and the required braking force.
Figure 8:
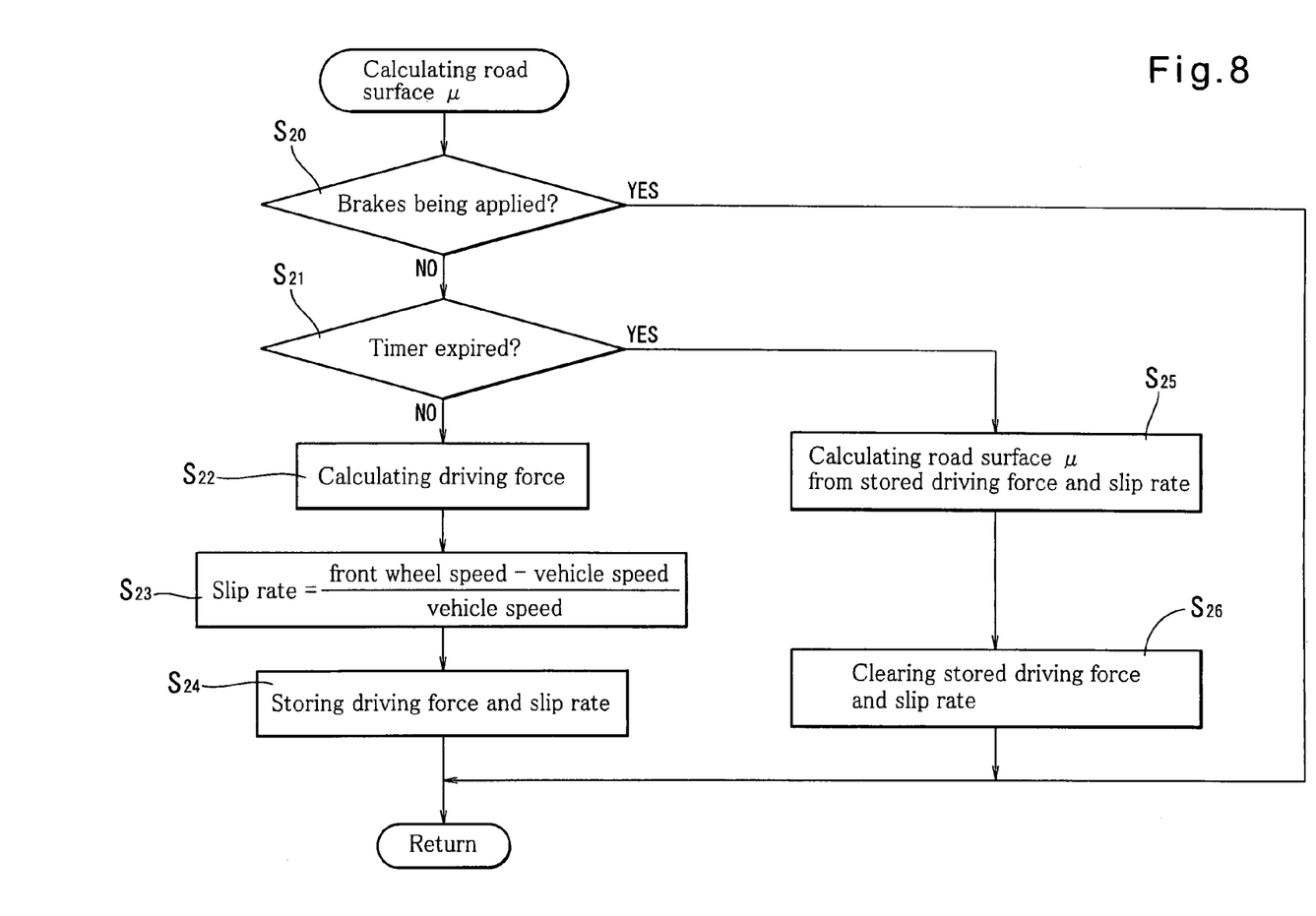
FIG. 8 is a flowchart of the subroutine in Step S4 of FIG. 5.

The program then calculates in Step S3 the braking force required by a driver based on the brake operating amount, i.e. the brake operation by the driver (such braking force is hereinafter referred to as "required braking force"). The required braking force is calculated in the subroutine shown in FIG. 6 as follows. If the program determines that the master cylinder pressure sensors 14A and 14B are functioning normally in Step S10, the required braking force is calculated from the current hydraulic pressure in the master cylinder 12 based on the known correlation between the hydraulic pressure in the master cylinder 12 and the required braking force shown in FIG. 7 (Step S11).

If the program determines that the master cylinder pressure sensors 14A and 14B are not functioning normally in Step S10, the required braking force is set at zero in Step S12. The program then proceeds to Step S13 to open the master cylinder pressure shut-off valves 30A and 30B and close the simulator shut-off valve 16, pressure-increasing control valves 22FL, 22FR, 22RL and 22RR, and pressure-reducing control valves 23FL, 23FR, 23RL and 23RR (this state is shown in FIG. 4), thereby supplying the hydraulic pressure in the master cylinder 12 directly to the wheel cylinders 17FL and 17FR.

The program then calculates the friction coefficient μ of the road surface in Step S4. The friction coefficient μ is calculated in the subroutine shown in FIG. 8 as follows. When the program determines that the brake is not being applied to the front wheel FL in Step S20, the driving force applied to the front wheel FL and the slip rate of the front wheel FL are calculated in Steps S22 and S23. Data on the thus calculated driving force and slip rate are stored in a memory (not shown) in Step S24. The slip rate of the front wheel is the ratio of the difference between the speed of the front wheel FL and the vehicle speed to the vehicle speed. Here, as the vehicle speed, the speed of the non-drive rear wheel RL is used. Steps S22, S23 and S24 are repeatedly carried out until a timer expires in Step S21.

Figure 9:
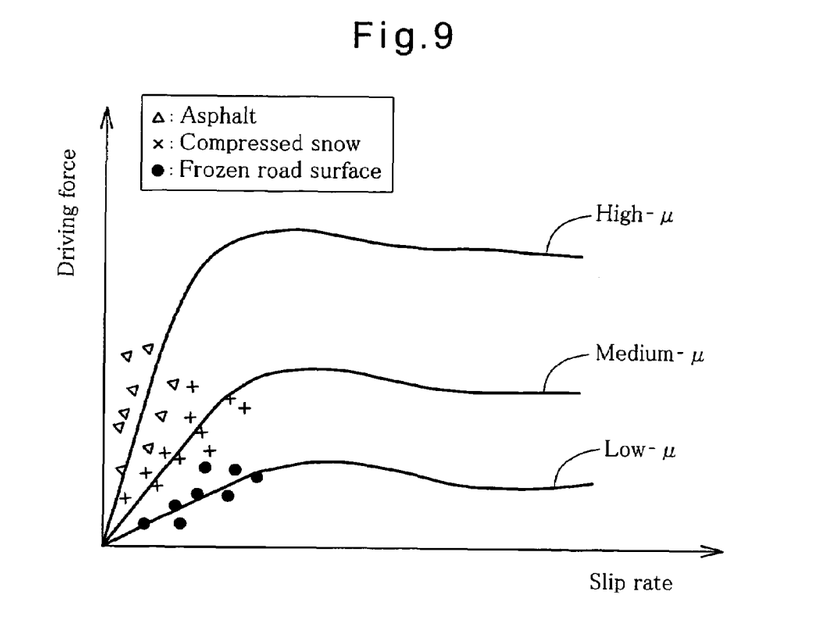
FIG. 9 is a graph showing the relationship between the driving force and the slip rate.
Figure 10:
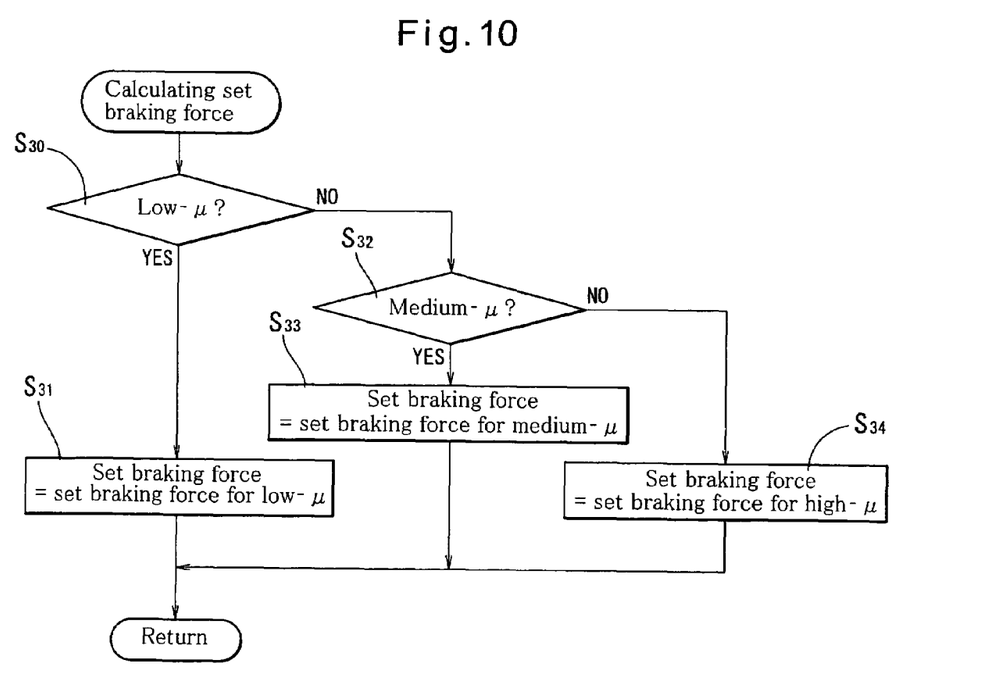
FIG. 10 is a flowchart of the subroutine in Step S5 of FIG. 5.

When the timer expires in Step S21, the program calculates (in Step S25) the friction coefficient μ of the road surface based on the driving forces and the slip rates stored in the memory. Specifically, as shown in FIG. 9, the program predetermines a plurality of groups of correlations between the driving force and the slip rate, each group corresponding to one of a plurality of friction coefficients (such as high-μ, medium-μ and low-μ), obtains the correlations between the driving forces and the slip rates stored in the memory, selects one of the plurality of groups of correlations that are closest to the correlations obtained, and determines the friction coefficient corresponding to the selected groups of correlations as the friction coefficient μ. Data on the driving forces and the slip rates stored in the memory are erased upon determination of the friction coefficient μ (Step S26).

The program then determines a value at which the regenerative braking force is kept immediately before the start of anti-lock control (hereinafter referred to as "ABS control") in Step S5. (Such a value is hereinafter referred to as "set braking force".) The set braking force is determined in the subroutine shown in FIG. 10 as follows. If the program determines (in Step S30) that the calculated friction coefficient μ is low and thus the vehicle is traveling on a frozen road surface, braking force for low-μ is assigned to the set braking force in Step S31. If the program determines (in Step S32) that the calculated friction coefficient μ is at a medium level and thus the vehicle is traveling on compressed snow, braking force for medium-μ which is greater than the braking force for low-μ is assigned to the set braking force in Step S33. If the program determines that the friction coefficient μ is not low in Step S30 and not at a medium level in Step S32, it is assumed that the vehicle is traveling on asphalt. Thus, braking force for highs that is larger than the braking force for medium-μ is assigned to the set braking force in Step S34.

The program then determines whether to start/stop the adjustment of the ratio between the frictional braking force and the regenerative braking force in Step S6. This determination is made in the subroutine shown in FIG. 11 as follows. First, if the program determines that the brakes are being applied to the front wheels FL and FR in Step S40, the slip rates of the respective front wheels FL and FR are calculated in Step S41. The slip rates are calculated from the vehicle speed, which is in this case the highest one of the speeds of the front wheels FL and FR and the rear wheels RL and RR, and the speeds of the respective front wheels FL and FR.

Figure 11:
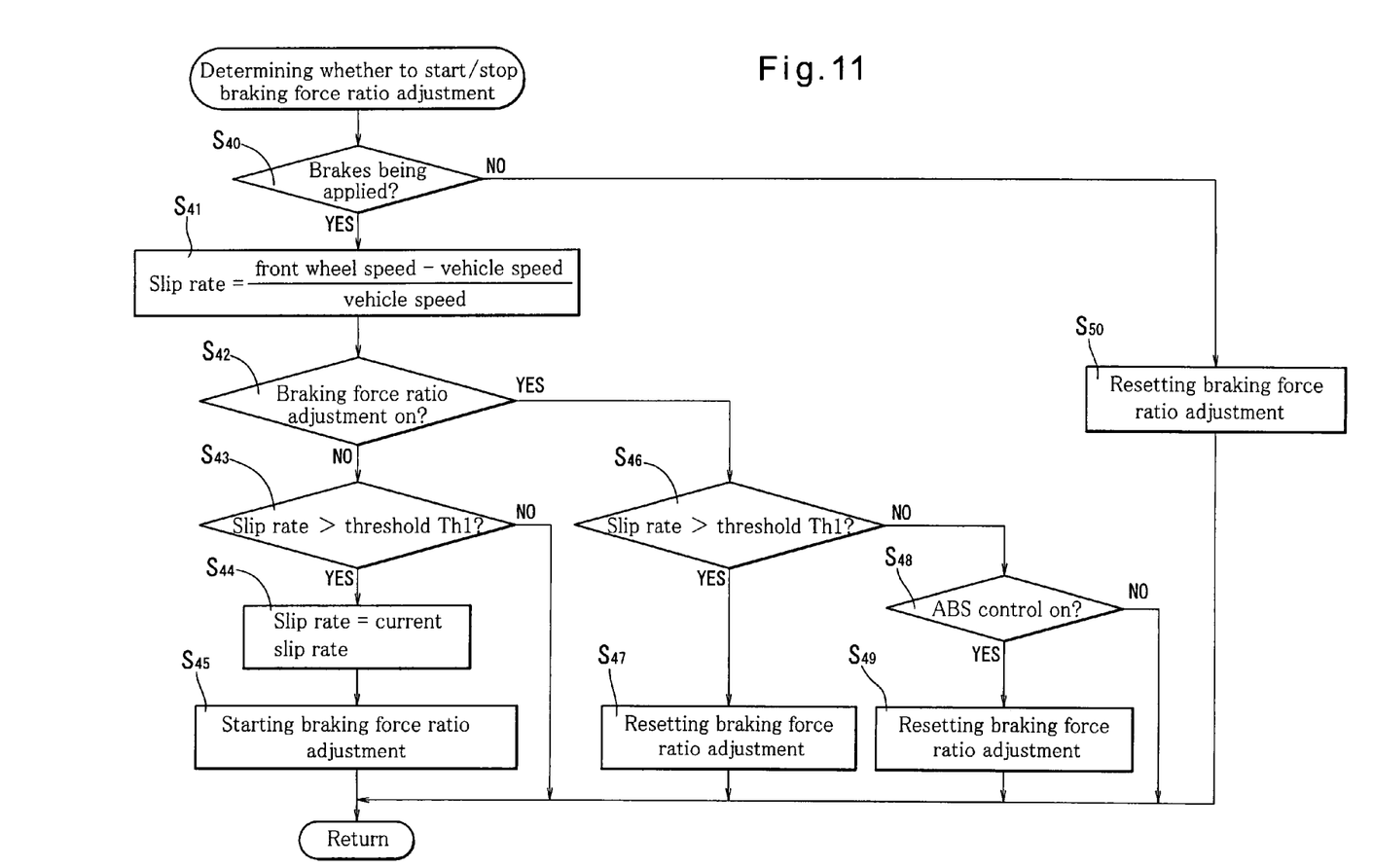
FIG. 11 is a flowchart of the subroutine in Step S6 of FIG. 5.

If the program determines (in Step S42) that the frictional-to-regenerative braking force ratio adjustment has not yet started, determination is made on whether the slip rates of the respective front wheels FL and FR are higher than a threshold Th1 in Step S43. If at least one of the slip rates is higher than the threshold Th1, this slip rate is assigned to a slip rate at the start of the braking force ratio adjustment (Step S44), and the braking force ratio adjustment is started at once (in Step S45) because in this state, ABS control is expected to start soon.

If the braking force ratio adjustment has already started in Step S42, the program determines in Step S46 whether the slip rates of the respective front wheels FL and FR are lower than the threshold Th1. If the slip rates of the front wheels FL and FR are both below the threshold Th1, the program determines that there is little possibility that the ABS control may start, and terminates the braking force ratio adjustment (Step S47). If the ABS control has already started in Step S48, too, the program terminates the braking force ratio adjustment (Step S49). Further, if the program determines that the brake pedal has been released or the brakes have been otherwise released in Step S40, too, the program determines that there is little possibility that the ABS control may start, and terminates the braking force ratio adjustment in Step S50.

Next, the program calculates the regenerative braking force and the frictional braking force to be applied to each of the front wheels FL and FR in Step S7. They are calculated in the subroutine shown in FIG. 12 as follows. If the program determines in Step S60 that the regenerative braking by the motor 2 is prohibited because e.g. the battery 7 is fully charged, the regenerative braking force is set at zero and the frictional braking force is set equal to the required braking force (Step S70).

Figure 12:
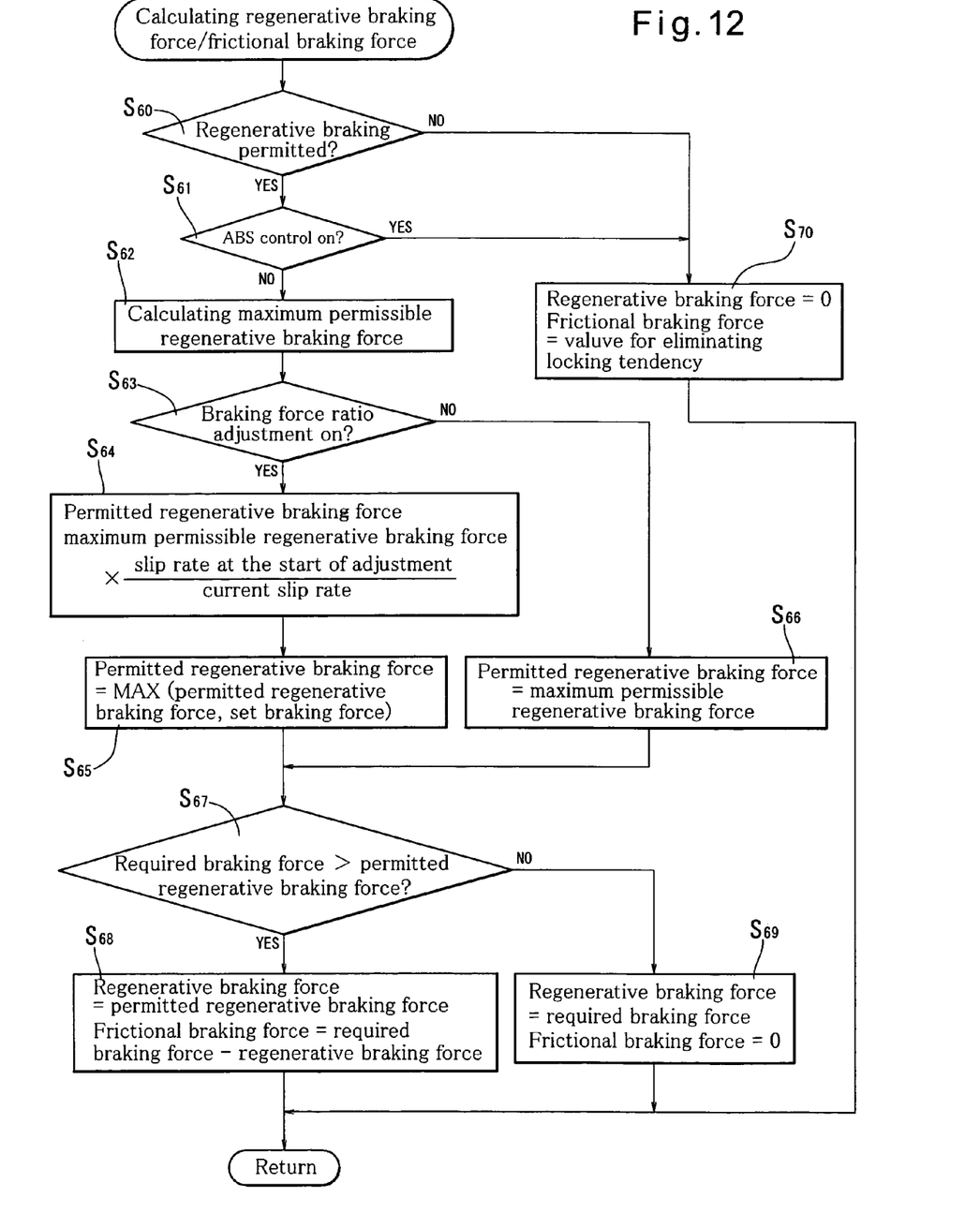
FIG. 12 is a flowchart of the subroutine in Step S7 of FIG. 5.

If the regenerative braking by the motor 2 is not prohibited in Step S60, the program calculates the maximum permissible regenerative braking force that can be generated by the motor 2 (hereinafter referred to as "maximum permissible regenerative braking force") in Step S62. The maximum permissible regenerative braking force may be calculated from the charge level of the battery as detected by the battery ECU 8 based on a predetermined correlation between the maximum permissible regenerative braking force and the charge level of the battery 7.

The program then calculates the regenerative braking force that is permitted to be generated (hereinafter referred to as "permitted regenerative braking force"). Specifically, if the program determines that the braking force ratio adjustment has not yet started in Step S63, the permitted regenerative braking force is set equal to the maximum permissible regenerative braking force in Step S66.

If the program determines that the braking force ratio adjustment has already started in Step S63, the permitted regenerative braking force is set equal to the maximum permissible regenerative braking force multiplied by the ratio of the slip rate when the braking force ratio adjustment has started to the current slip rate (Step S64). When the permitted regenerative braking force is determined to be lower than the set braking force, it is set equal to the set braking force (Step S65).

Based on the permitted regenerative braking force and the required braking force, the actually generated regenerative braking force and frictional braking force are determined. Specifically, if the required braking force is determined to be greater than the permitted regenerative braking force in Step S67, the actually generated regenerative braking force is set equal to the permitted regenerative braking force, and the frictional braking force is set equal to the required braking force subtracted by the regenerative braking force (Step S68). If the required braking force is determined to be not greater than the permitted regenerative braking force in Step S67, the regenerative braking force is set equal to the required braking force, and the frictional braking force is set at zero in Step S69.

The ratio between the actually generated regenerative braking force and frictional braking force is adjusted as described above only before the ABS control starts. When the program determines that the ABS control has started in Step S61, the regenerative braking force is reduced to zero, and the frictional braking force is determined to such a value that the locking tendency of the front wheels is eliminated in Step S70.

The program then determines whether to start/stoop the ABS control in Step S8. ABS control starts if one of the front wheels FL and FR shows a tendency to lock up to prevent lockup of this wheel by controlling the frictional braking force applied thereto. Determination on whether to start/stop ABS control is made in the subroutine shown in FIG. 13 as follows. If the program determines in Step S80 that braking force is being applied to the front wheels S80 and in Step S81 that the ABS control has not yet started, the program determines in Step S82 whether the requirements for starting the ABS control are met by e.g. determining whether the slip rate of either one of the front wheels FL and FR is higher than a threshold Th2 (which is greater than the abovementioned threshold Th1) or the deceleration of either one of the front wheels FL and FR is higher than a predetermined value which corresponds to the threshold Th2. If these requirements are met, the ABS control starts at once (Step S83).

Figure 13:
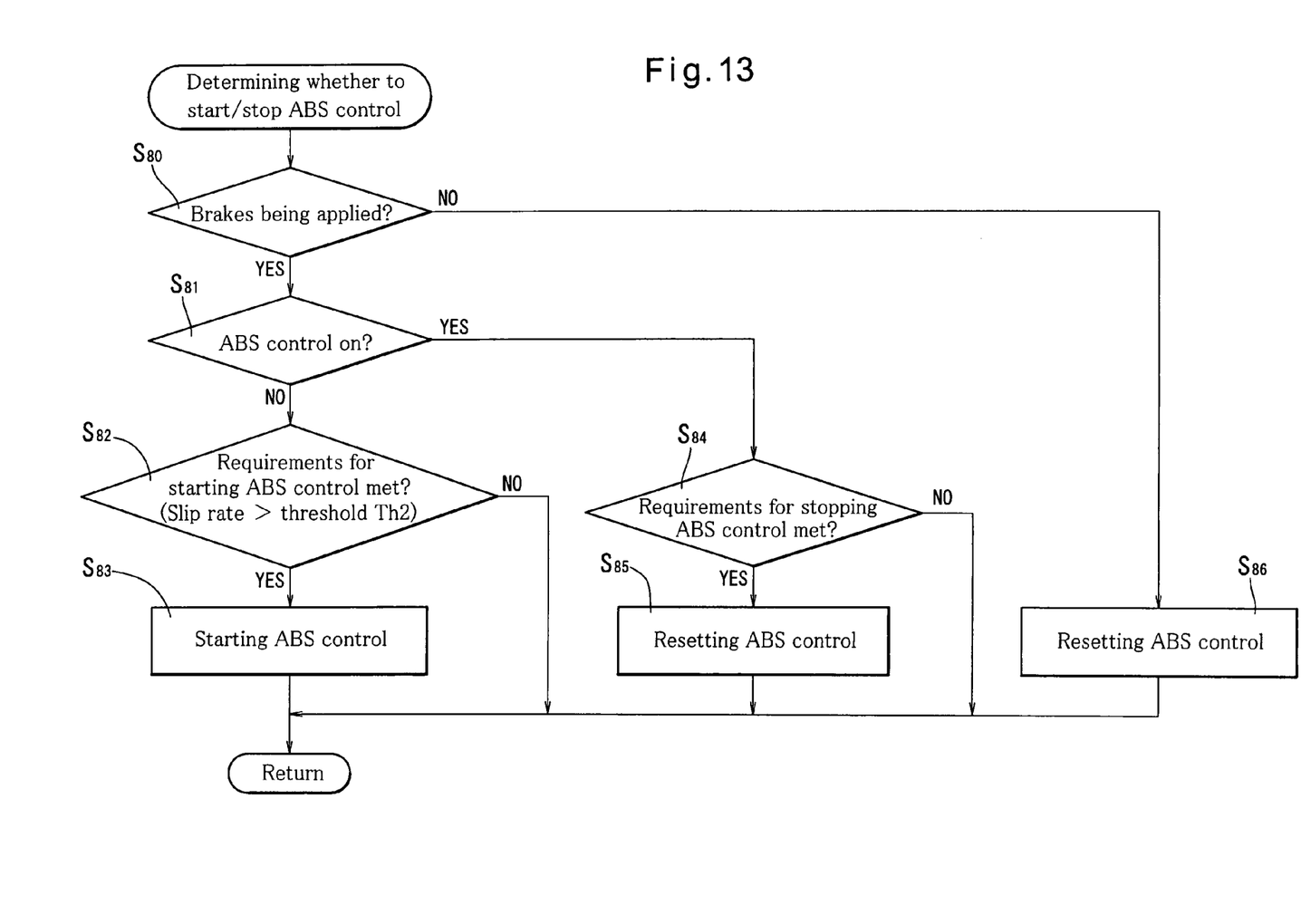
FIG. 13 is a flowchart of the subroutine in Step S8 of FIG. 5.

If the program determines in Step S81 that the ABS control has already started, the program then determines in Step S84 whether the requirements for stopping the ABS control are met. If such requirements are met, the ABS control is stopped in Step S85. If the program determines in Step S80 that the driver has released the brake pedal or otherwise the brake operation has been terminated, too, the ABS control is terminated (in Step S86).

In the subsequent Step S9, the hybrid ECU 10 applies a control signal to the inverter 9, while the brake ECU 24 applies control signals to the pressure increasing control valves 22FL and 22FR and the pressure reducing control valves 23FL and 23FR to control the regenerative braking force and the frictional braking force to the respective target values.

More specifically, by controlling the inverter 9, the target regenerative braking force is generated from the motor 2, which is now functioning as a generator. By controlling the pressure increasing control valves 22FL and 22FR and the pressure reducing control valves 23FL and 23FR, hydraulic pressures in the wheel cylinders 17FL and 17FR are adjusted to such values that the target frictional braking force is generated by each of the wheel cylinders 17FL and 17FR.

Figure 14A:
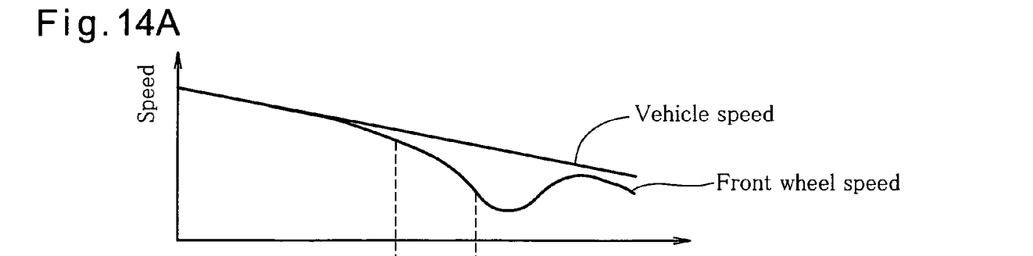
FIG. 14A is a graph showing, in the vehicle brake system of FIG. 1, how the vehicle speed and the front wheel speed change with time when the brake pedal is depressed until the ABS control starts.
Figure 14B:
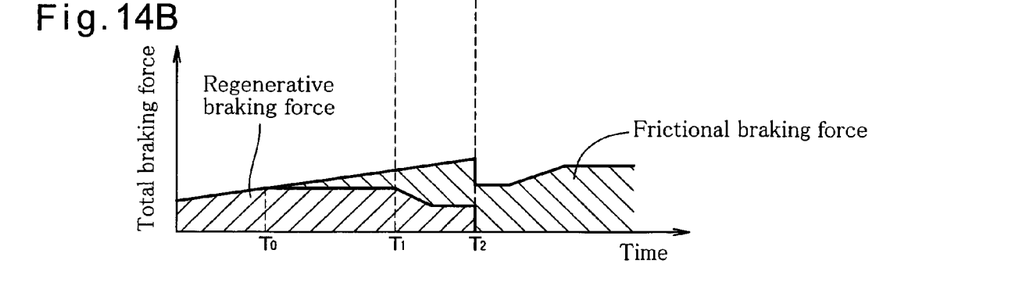
FIG. 14B is a graph showing, in the vehicle brake system of FIG. 1, how the regenerative braking force and the frictional braking force change with time when the brake pedal is depressed until the ABS control starts.

FIGS. 14A and 14B show how the regenerative braking force and the frictional braking force change when the brake pedal 11 is depressed until the ABS control starts.

While the required braking force (brake operating amount) is small, regenerative braking force equal to the required braking force is generated, and no frictional braking force is generated. When the required braking force increases and exceeds the maximum permissible regenerative braking force (at time T0), regenerative braking force that is equal to the maximum permissible regenerative braking force is generated, and also, frictional braking force that is equal to the required braking force subtracted by the regenerative braking force is generated.

When the required braking force further increases and the slip rate of at least one of the front wheels exceeds the threshold Th1 (at time T1), the braking force ratio adjustment starts. When the braking force ratio adjustment starts, the regenerative braking force is reduced to and kept at the set braking force. When the regenerative braking force is reduced, the frictional braking force is correspondingly increased. Thereafter, if the requirements for starting the ABS control are met (that is, if the slip rate of at least one of the front wheels exceeds the threshold Th2) and thus the ABS control starts (at time T2), the regenerative braking force, which has been kept at the set braking force immediately before the start of the ABS control, drops to zero.

Figure 15A:
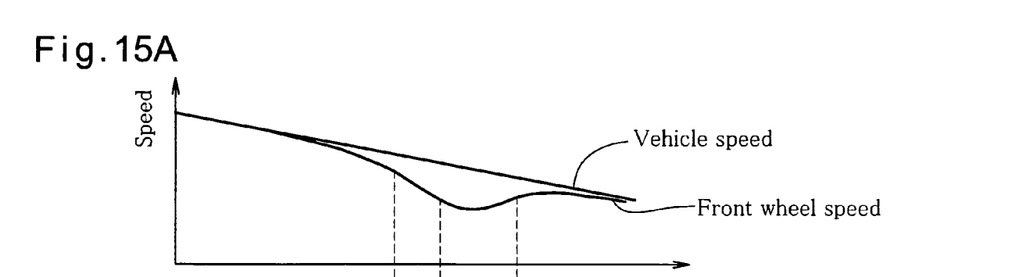
FIG. 15A is a graph showing, in the vehicle brake system of FIG. 1, how the vehicle speed and the front wheel speed change with time when the brake pedal is depressed until the ABS control is about to start and then the pressure on the brake pedal is reduced.
Figure 15B:
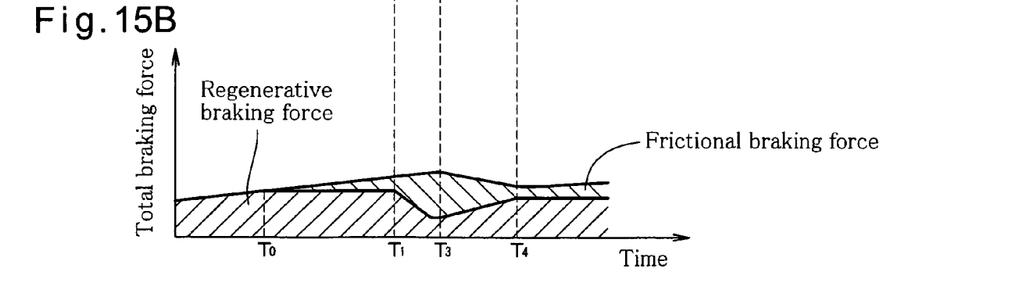
FIG. 15B is a graph showing, in the vehicle brake system of FIG. 1, how the regenerative braking force and the frictional braking force change with time when the brake pedal is depressed until the ABS control is about to start and then the pressure on the brake pedal is reduced.

If, on the other hand, after the brake pedal 11 has been depressed until the ABS control is about to start, the pedal force is reduced, the regenerative braking force and the frictional braking force change as shown in FIGS. 15A and 15B.

Specifically, when the required braking force (brake operating amount) increases and the slip rate of at least one of the front wheels FL and FR exceeds the threshold Th1 (at time T1), the braking force ratio adjustment starts. When the required braking force further increases, the regenerative braking force is reduced to and kept at the set braking force, while the frictional braking force is correspondingly increased. When the required braking force decreases thereafter (at time T3), the slip rates of the front wheels FL and FR decrease, so that the regenerative braking force increases while the frictional braking force decreases. When the required braking force further decreases, the slip rates of both front wheels FL and FR fall below the threshold Th1 (at time T4). The braking force ratio adjustment thus ends at time T4.

With this arrangement, as shown in FIGS. 14A and 14B, the regenerative braking force is kept at the set braking force before the start of the ABS control, and at the start of the ABS control, the regenerative braking force falls from the set braking force to zero. Since the regenerative braking force can be changed, i.e. reduced to zero, more rapidly in response to a control signal than the mechanically generated frictional braking force, it is possible to rapidly eliminate the tendency of either of the front wheels FL and FR to lock up, thereby stabilizing the vehicle.

Further, according to the present invention, since the regenerative braking force is kept at the set braking force before the start of the ABS control, it is possible to recover energy by regenerative braking even when the ABS control is about to begin.

Also, because the regenerative braking force decreases corresponding to an increase in the slip rates before the start of the ABS control, even if the slip rates increase sharply before the start of the ABS control, the regenerative braking force decreases corresponding to such a sharp rise in the slip rates, while the frictional braking force correspondingly increases. Thus, irrespective of whether the slip rates increase moderately or sharply before the start of the ABS control, the reduction of the regenerative braking at the start of the ABS control is sufficiently small. This prevents unduly sharp deceleration of the vehicle when the ABS control has started.

Moreover, according to the present invention, if the slip rates fall after they increase to such an extent that the ABS control is about to begin, the regenerative braking force increases corresponding to the reduction in the slip rates. This allows more efficient recovery of energy by regenerative braking when the ABS control is about to begin.

In the embodiment, the set braking force for low-$\mu$ is preferably set at half the maximum frictional force produced on a frozen road. With this arrangement, it is possible to rapidly eliminate the tendency of either of the front wheels FL and FR to lock up while minimizing a reduction in the regenerative braking force at the start of the ABS control. Similarly, the set braking force for medium-$\mu$ is preferably set at half the maximum frictional force produced on a road surface covered with compressed snow, and the set braking force for high$\mu$ is preferably set at half the maximum frictional force produced on asphalt. The maximum frictional force is determined by the friction coefficient $\mu$ of the road surface, the friction coefficient of each wheel, the vehicle weight, etc.

In the embodiment, the friction coefficient $\mu$ is calculated based on the driving force applied to the front wheel FL and the slip rate of the front wheel FL. But the friction coefficient $\mu$ may be calculated based on the driving force applied to the other front wheel FR and the slip rate of the front wheel FR. Otherwise, the friction coefficient $\mu$ may be calculated based on the braking force applied to the front wheel FL and the slip rate of the front wheel FL.

In the embodiment, the regenerative braking force, which has been kept at the set braking force before the start of the ABS control, is reduced to zero upon the start of the ABS control. But it may be reduced to a value greater than zero at the start of the ABS control. According to the present invention, it is important to significantly reduce the regenerative braking force at the start of the ABS control. If the regenerative braking force is reduced to a value greater than zero at the start of the ABS control, it is preferably reduced to half the maximum frictional force. With this arrangement, it is possible to rapidly eliminate the tendency of either of the front wheels to lock up while minimizing a reduction in the regenerative force at the start of the ABS control.

The regenerative braking force may be reduced to and kept at the set braking force before the start of the ABS control in a different manner. For example, upon the start of the braking force ratio adjustment, the regenerative braking force may be reduced to the set braking force at a constant rate and kept at the set braking force.

The concept of the present invention is applicable not only to front-wheel drive vehicles as described in the embodiment, but to rear-wheel drive vehicles and four-wheel drive vehicles.

What is claimed is:

1. A vehicle brake system for controlling a frictional braking force applied to a wheel of a vehicle by means of a friction brake and a regenerative braking force applied to the wheel of the vehicle by a motor;

said vehicle brake system comprising:

an anti-lock controller for performing anti-lock control in which the friction brake is controlled to prevent the wheel from locking when the wheel shows a tendency to lock;

calculating means for calculating a predetermined force before start of said anti-lock control, wherein said predetermined force is always greater than zero and less than the regenerative force being applied to the wheel;

regenerative braking force adjusting means for reducing the regenerative braking force to said predetermined force before the start of said anti-lock control;

frictional braking force adjusting means for increasing the frictional braking force corresponding to the reduction of the regenerative braking force by said regenerative braking force adjusting means;

regenerative braking force holding means for holding the regenerative braking force at said predetermined force after the regenerative braking force has been reduced to said predetermined force by said regenerative braking force adjusting means; and a regenerative braking force reducing means for reducing said regenerative braking force from said predetermined force when said anti-lock control starts.

2. The vehicle brake system of claim 1 further comprising a friction coefficient detector for detecting a friction coefficient of a road surface on which the vehicle is traveling, said predetermined force being calculated by said calculating means based on a friction coefficient detected by said friction coefficient detector.

3. The vehicle brake system of claim 2 wherein said predetermined force is calculated by said calculating means to half a maximum frictional force generated on the road surface of which the friction coefficient is detected by said friction coefficient detector.

4. The vehicle brake system of claim 1 further comprising a slip rate detector for detecting a slip rate of the wheel, said regenerative braking force adjusting means being configured to reduce said regenerative braking force corresponding to an increase in said slip rate to said predetermined force.

5. The vehicle brake system of claim 4 wherein said regenerative braking force adjuster has an additional function of increasing said regenerative braking force corresponding to a reduction in said slip rate, and wherein said frictional braking force adjuster has an additional function of reducing said frictional braking force corresponding to an increase in said regenerative braking force while said regenerative braking force is being increased by said regenerative braking force adjuster.

6. The vehicle brake system of claim 1 wherein said anti-lock controller starts said anti-lock control when a slip rate of the wheel exceeds a first threshold, and wherein said braking force ratio adjuster starts said braking force ratio adjustment when the slip rate of the wheel exceeds a second threshold that is smaller than said first threshold.

7. A vehicle brake system for controlling a frictional braking force applied to a wheel of a vehicle by means of a friction brake and a regenerative braking force applied to the wheel of the vehicle by a motor such that a target braking force determined by a braking operation of a driver of the vehicle is applied to the wheel of the vehicle; said vehicle brake system comprising:

calculating means for calculating a predetermined force before start of said anti-lock control, wherein said predetermined force is always greater than zero and less than the regenerative force being applied to the wheel;

a regenerative braking force adjusting means for reducing said regenerative braking force being applied to the wheel of the vehicle corresponding to the braking operation of the driver to said predetermined force, if a slip rate of the wheel exceeds a predetermined threshold due to the braking operation of the driver;

frictional braking force adjusting means for increasing the frictional braking force corresponding to the reduction of the regenerative braking force by said regenerative braking force adjusting means;

regenerative braking force holding means for holding the regenerative braking force at said predetermined force after the regenerative braking force has been reduced to said predetermined force by said regenerative braking force adjusting means; and an anti-lock controller for starting said anti-lock control and further reducing said regenerative braking force from said predetermined force if said slip rate further increases after exceeding said predetermined threshold as a result of continued brake operation of the driver.

* * * * *